Oct. 27, 1931.   W. H. PAWSON   1,829,294
AGRICULTURAL IMPLEMENT
Filed Oct. 23, 1929
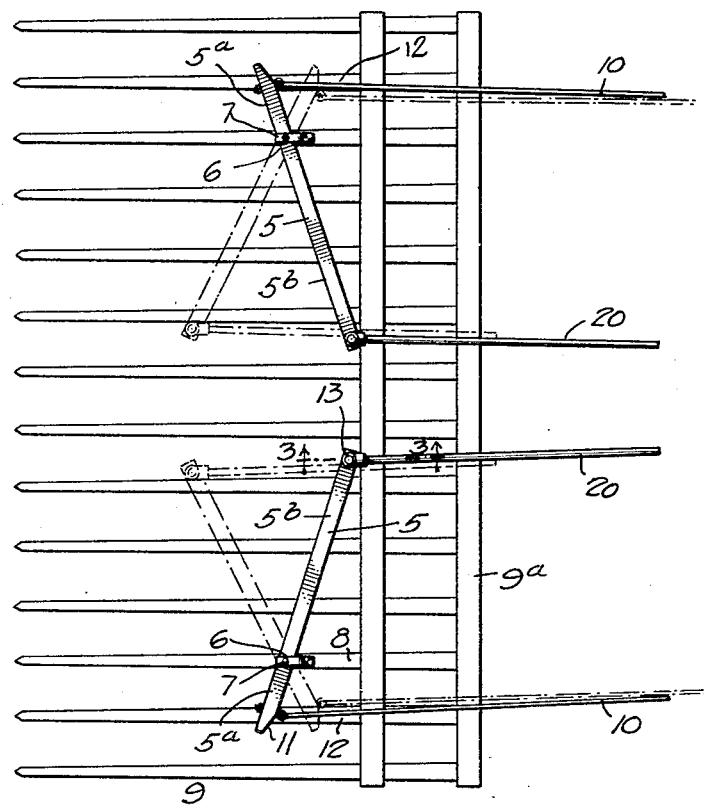
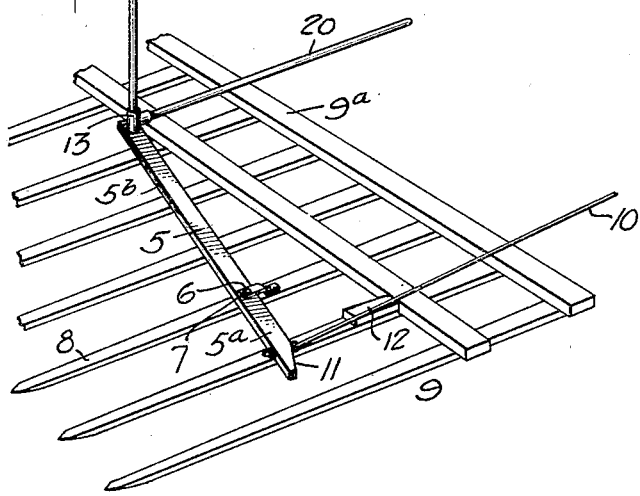
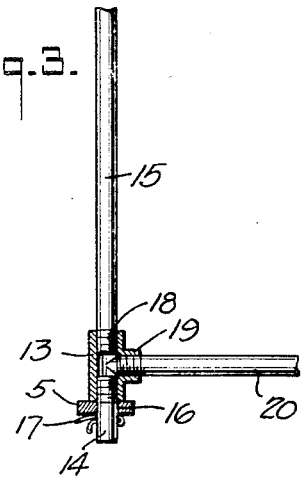
INVENTOR
W H. PAWSON
BY
ATTORNEYS Patented Oct. 27, 1931

1,829,294

UNITED STATES PATENT OFFICE

WILLIAM H. PAWSON, OF HEMET, CALIFORNIA

AGRICULTURAL IMPLEMENT

Application filed October 23, 1929. Serial No. 401,814.

My invention relates to agricultural implements, and more particularly to rakes of the buck or sweep type intended to be pushed by draft animals or other power over a field, and same has for an object the employment of a novel, positively acting load ejector which functions to effect a positive discharge of the load during the act of reversing the direction of movement of the draft animals, such as, for instance, when backing the rake.

A further object of the invention resides in the provision of a device of this character which, and aside from its being positively acting and entirely reliable will be simple of construction, light in weight and of a form and design that can be manufactured at small cost.

A further object of the invention resides in the provision of a device of this character which can be applied to well-known forms of rakes without requiring alterations in the construction thereof.

Another object of the invention is to provide means for relieving the ejecting mechanism of undue loads and torsional strains.

In the accompanying drawings,

Figure 1 is a view in plan of my mechanism applied to the common form of buck or sweep rake;

Figure 2 is a view in perspective of a portion of the rake showing the load ejector in a retracted or load-receiving position; and Figure 3 is a view taken approximately on line 3—3 of Figure 1.

In carrying the invention into practice, use is made of a swinging bar 5 pivoted for horizontal movement at 6 in a clip or bracket 7, the latter secured to one of the teeth 8 of a rake head 9. The bar or lever 5 is provided with a short end 5a and a long end 5b, to the former of which is connected a backing strap 10 adapted to be connected with a draft animal. In the ejecting position of the lever 5, the face 11 of the short end 5a is adapted to come in contact with a stop block 12 secured to an adjacent rake tooth of the head 9, where it checks movement of the lever to thereby avoid disrupting any of the parts of the mechanism incident to the application of loads thereto imparted by the backing action of the draft animal.

The free extremity of the long end 5b of the arm or lever 5 is provided with a vertically disposed T-member 13 having a depending short length of pipe 14 or the equivalent thereof which serves as a means of connecting the ejector head 15 with said lever or bar 5. The said short length of pipe 14 passes through a perforation 16 near the free extremity of the long end 5b of said swinging lever or bar, and same is secured against accidental displacement therefrom by a cotter pin 17 driven through the pipe section 14 at a point beneath the under surface of the said bar 5.

The ejector head 15 has its lower end threadedly connected at 18 in the T-member 13. Extending rearwardly from the T-member and joined thereto at 19 is a bar or rod 20 which may be in the form of a pipe section. This bar 20 freely rests upon the rear structure 9a of the rake head 9 and is adapted to slide thereover and to resist the effect of loads thrust against the ejector bar 15 and balance the movement of the bar and prevent torsional strains from being applied with disrupting or disorganizing effect thereto.

In the drawings, I show two levers 5 applied to the rake head 9 at respectively opposite sides of the median line of the head. This is because of the fact that the specific rake herein illustrated is of the type intended to be operated by two draft animals. In this respect I do not wish to be limited and it shall be understood that I may use one or any suitable number of such levers and ejecting mechanisms as may be found desirable according to the nature of the rake employed.

In operation, it will be assumed on reference to either Figure 1 or 2 of the drawings that the rake is being propelled in a forward or hay-collecting or gathering direction and that the tines or teeth of the rake head are engaged in the work of collecting the material and causing an accumulation thereof in the direction of the rear end of the rake head. Incident thereto, the collected load is being moved against the long ends of the respective swinging levers 5 where the ejector heads 15 will be maintained in what may be described as normal or retracted positions. This is made possible because of the free disposition of the long end of each ejector 5 with respect to the head plus the fact that the draft line 10 is relatively slack. After the load is collected and it is desired to eject the same from the rake a slight backing of the draft animals causes power to be supplied to the draft bars 5 shown in Figure 1, whereby to effect movement of the long ends of these bars in a forward position. The full force and effect of the ejectors 15 then manifests itself against the accumulated load, so that a positive discharge of the material from the rake will result.

While I have described that movement may in the present instance be transferred to the bar 5 by virtue of the customary functioning of the backing strap 10, it is to be understood that I do not wish to be limited in this connection, particularly where the invention is used in association with motor or even hand propelled rakes, at which time any suitable well known means can be employed to transfer the required movements to said lever.

I claim as my invention:

1. The combination, with a push rake, of a load ejector therefor consisting of a plurality of identical ejector levers pivoted adjacent their outer ends to the opposite sides of the rake so that each lever is provided with a long end and a short end, the said levers being angularly related to one another so that a line drawn longitudinally through one lever will intersect a line drawn longitudinally through the other lever at a point about medially of the rake, a vertical head carried by and extending from the long end of each ejector lever, a balancing member extending rearwardly from each ejector lever and adapted to move with the head and over a portion of the rake, and a draft line extending from the short end of each lever.

2. The combination with a rake, of a load ejector carried thereby and including a horizontal lever pivotally connected therewith, the lever having a short end and a long end, a draft line connected with the short end of the lever and adapted to impart ejecting movement to the lever when pull is applied to said line, and a vertically extending ejector bar carried by the long end of said lever and positioned at the free extremity thereof.

3. The combination with a rake, of a load ejector carried thereby and including a horizontal lever pivotally connected therewith, the lever having a short end and a long end, a draft line connected with the short end of the lever to impart ejecting movement to the lever when pull is applied to said line, a vertically extending ejector bar carried by the long end of the lever adjacent to the free extremity thereof, a T-member on the lever for supporting the ejector bar upon the lever, and a balancing bar carried by the T-member and extending in a horizontal direction toward the rear of the rake and serving to prevent torsional strains being imparted to the lever incidental to the effect of loads imparted to said ejector bar.

4. The combination with a rake of a load ejector carried thereby and including a horizontal lever pivotally connected therewith, the lever having a short end and a long end, a draft line connected with the short end of the lever for imparting ejecting movement to the lever when pull is exerted upon said line, a vertically extending ejector bar carried by the long end of the lever adjacent the outer extremity thereof, a T-member on the lever for supporting the ejector bar, a balancing bar carried by the T-member and extending in a horizontal direction toward the rear of the rake and serving to prevent torsional strains being imparted to the lever incident to the effect of loads imparted to the ejector bar and a stop carried by the rake and disposed in the path of the rearward movement of the short end of said lever.

5. A load ejector for push head rakes comprising a lever, a bracket adapted to be secured to a rake, the bracket having pivoted connection with the lever to permit the latter to turn about a vertical axis, said bracket positioned adjacent one end of the lever, a T-member carried by and rising vertically from the opposite end of the lever, an ejector head secured at its lower end to one branch of the T-member and rising vertically therefrom, and a bar secured at one of its ends to another branch of the T-member and occupying a position at right angles to the ejector head and adapted to freely rest upon the head of a rake when the ejector is applied thereto and serving to resist the effect of a load when thrust against the ejector head and to balance the movement of the lever and to counteract the effect of torsional strains when imparted thereto.

WILLIAM H. PAWSON.